(12) United States Patent
Good (10) Patent No.: US 10,773,795 B2
(45) Date of Patent: Sep. 15, 2020

(54) DISTRIBUTED LINEAR HYDRAULIC HIGH LIFT ACTUATION SYSTEM WITH SYNCHRONIZATION MEMBERS

(71) Applicant: The Boeing Company, Chicago, IL (US)

(72) Inventor: Mark S. Good, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 106 days.

(21) Appl. No.: 16/139,423

(22) Filed: Sep. 24, 2018

(65) Prior Publication Data

US 2020/0094945 A1 Mar. 26, 2020

(51) Int. Cl.
*B64C 13/36* (2006.01)
*B64D 45/00* (2006.01)
*F15B 11/22* (2006.01)

(52) U.S. Cl.
CPC .......... *B64C 13/36* (2013.01); *B64D 45/0005* (2013.01); *B64D 2045/001* (2013.01); *F15B 11/22* (2013.01); *F15B 2211/782* (2013.01)

(58) Field of Classification Search
CPC ............................ F15B 11/22; F15B 2211/782
See application file for complete search history.

(56) References Cited

U.S. PATENT DOCUMENTS

| | | | | |
|---|---|---|---|---|
| 2,657,539 A | * | 11/1953 | Geyer ..................... | F15B 11/22 91/533 |
| 3,515,033 A | * | 6/1970 | Geyer ..................... | F02K 1/15 92/33 |
| 4,391,409 A | * | 7/1983 | Scholz ..................... | F02K 1/763 239/265.29 |
| 4,485,725 A | * | 12/1984 | Tootle ..................... | F15B 11/22 91/417 R |
| 5,609,020 A | * | 3/1997 | Jackson ..................... | F02K 1/76 244/110 B |

(Continued)

FOREIGN PATENT DOCUMENTS

DE 102012022287 A1 5/2014
EP 0831027 A2 3/1998

(Continued)

OTHER PUBLICATIONS

Parker Na,"Actuator Systems", Product description, retrieved on Sep. 24, 2018, retrieved online from : http://ph.parker.com/us/en/actuator-systems.

(Continued)

*Primary Examiner* — Michael Leslie
*Assistant Examiner* — Matthew Wiblin
(74) *Attorney, Agent, or Firm* — Coats & Bennett, PLLC (57) ABSTRACT

An actuation system for controlling flight control members of a vehicle. Each flight control member is controlled by two or more linear hydraulic actuators. Synchronization members extend between the hydraulic actuators on the same flight control members to synchronize the movements of the hydraulic actuators for consistent movement across the length of the flight control members. Brakes can maintain the positions of the synchronization members and thus the flight control members. Motors can provide for moving the synchronization members to control the positioning of the hydraulic actuators and flight control members.

20 Claims, 11 Drawing Sheets (56) References Cited

U.S. PATENT DOCUMENTS

| | | | |
|---|---|---|---|
| 6,076,767 A * | 6/2000 | Farley | B64C 13/38 |
| | | | 244/212 |
| 6,799,739 B1 | 10/2004 | Jones | |
| 6,837,054 B2 * | 1/2005 | Brocard | F15B 9/10 |
| | | | 60/771 |
| 7,435,180 B2 | 10/2008 | Kruegel et al. | |
| 8,713,911 B2 * | 5/2014 | Kopecek | F02K 1/72 |
| | | | 60/226.2 |
| 8,814,085 B2 * | 8/2014 | Richter | B64D 45/0005 |
| | | | 244/99.4 |
| 9,682,769 B2 * | 6/2017 | Richter | B64C 13/30 |
| 10,113,565 B2 * | 10/2018 | Kopp | F15B 9/10 |
| 2003/0070416 A1 * | 4/2003 | Johnson | B64D 33/04 |
| | | | 60/226.2 |
| 2008/0116317 A1 | 5/2008 | Steinberg | |
| 2011/0062282 A1 | 3/2011 | Richter et al. | |
| 2018/0163663 A1 * | 6/2018 | Hudson | F15B 11/22 |
| 2019/0217944 A1 | 7/2019 | Huynh | |
| 2019/0291850 A1 | 9/2019 | Huynh | |
| 2020/0070959 A1 | 3/2020 | Huynh | |

FOREIGN PATENT DOCUMENTS

| | | | | |
|---|---|---|---|---|
| EP | 3121116 A1 | | 1/2017 | |
| GB | 752612 A | * | 7/1956 | F15B 11/22 |
| GB | 2408725 A | * | 6/2005 | B64D 33/04 |
| WO | WO-9723719 A1 | * | 7/1997 | F15B 15/264 |
| WO | WO-0157382 A2 | * | 8/2001 | F02K 1/766 |

OTHER PUBLICATIONS

EP Search Report dated Feb. 12, 2020 in re EP Application No. 19198623.1.

* cited by examiner

DISTRIBUTED LINEAR HYDRAULIC HIGH LIFT ACTUATION SYSTEM WITH SYNCHRONIZATION MEMBERS

TECHNOLOGICAL FIELD

The present disclosure relates generally to actuation of flight control members on a vehicle and, more specifically, to actuation of flight control members that have individual control.

BACKGROUND

Vehicles such as aircraft include one or more movable flight control members to control the vehicle during flight. Movement of the flight control members is typically effected by one or more actuators mechanically coupled between a base (e.g., a wing spar) and the flight control member. In many vehicles, the actuators for flight control members are linear hydraulic actuators driven by a hydraulic system.

Hydraulic systems for aircraft can be designed to provide hydraulic fluid to the hydraulic actuators to move and position the flight control members as necessary during the flight of the aircraft. The hydraulic systems can include a series of supply and return lines. One or more hydraulic actuators are positioned along the supply and return lines and are attached to the flight control members. A pump moves the hydraulic fluid through the supply and to the actuators. The hydraulic fluid than is directed into different sections of the hydraulic actuators to move the hydraulic actuator and thus adjust the flight control member. The hydraulic fluid from the actuator is moved into the return line which returns the hydraulic fluid to the pump to be reused in the hydraulic system.

SUMMARY

One aspect is directed to an actuation system to control first and second flight control members on a vehicle. The actuation system includes a first pair of hydraulic actuators that are operatively connected to a first flight control member and a second pair of hydraulic actuators that are operatively connected to a second flight control member. A first synchronization member extends between the first pair of hydraulic actuators to synchronize movements of the first pair of hydraulic actuators. A second synchronization member extends between the second pair of hydraulic actuators to synchronize movements of the second pair of hydraulic actuators. The second synchronization member is independent from the first synchronization member. A first brake prevents movement of the first synchronization member and a second brake prevents movement of the second synchronization member. A first motor is operatively connected to the first synchronization member to adjust the first pair of hydraulic actuators to adjust the first flight control member independently from the second flight control member. A second motor is operatively connected to the second synchronization member to adjust the second pair of hydraulic actuators to adjust the second flight control member independently from the first flight control member.

In another aspect, each of the first pair of hydraulic actuators and the second pair of hydraulic actuators includes a slave hydraulic actuator and a pacing hydraulic actuator with the slave hydraulic actuator including meshing first and second worm gears and the pacing hydraulic actuator including meshing first and second gears with a same efficiency in both operating directions.

In another aspect, the first and second gears of the pacing hydraulic actuators are configured to back drive the synchronization members and the first and second worm gears of the slave hydraulic actuators are configured to prevent rotation of the synchronization members.

In another aspect, each of the first pair of hydraulic actuators and the second pair of hydraulic actuators includes a first chamber section that receives hydraulic fluid to extend a length of the first pair of hydraulic actuators and the second pair of hydraulic actuators and a second chamber section that receives the hydraulic fluid to retract a length of the first pair of hydraulic actuators and the second pair of hydraulic actuators.

In another aspect, the first and second synchronization members are spaced apart by a gap, the gap is positioned between the first pair of hydraulic actuators and the second pair of hydraulic actuators.

In another aspect, a hydraulic fluid line extends between each hydraulic actuator of the first pair of hydraulic actuators and the second pair of hydraulic actuators and wherein the first and second synchronization members are positioned within the hydraulic fluid line.

In another aspect, an actuation control unit is configured to receive signals from sensors indicating an angular orientation of the first synchronization member and the second synchronization member, and in response to the signals, adjust valves to control a flow of hydraulic fluid to the first pair of hydraulic actuators and the second pair of hydraulic actuators.

In another aspect, at least one of the first brake and the first motor are operatively connected to the first synchronization member between the first pair of hydraulic actuators.

In another aspect, the second brake is operatively connected to the second synchronization member at a first point and the second motor is operatively connected to the second synchronization member at a different second point.

One aspect is directed to an actuation system to control first and second flight control members on a vehicle. The actuation system includes two or more control segments that extend along the vehicle. Each of the control segments includes a flight control member, hydraulic actuators that are operatively connected to the flight control member, a synchronization member that extends between and is connected to the hydraulic actuators to synchronize movements of the hydraulic actuators, a brake operatively connected to the synchronization member to prevent rotation of the synchronization member, and a motor operatively connected to the synchronization member to rotate the synchronization member to adjust the hydraulic actuators and position the flight control member relative to the vehicle. An actuation control unit includes a processing circuit to position the flight control members relative to the vehicle. The synchronization members are spaced apart along the vehicle and are independent from each other.

In another aspect, the hydraulic actuators of the control segments include a slave hydraulic actuator and a pacing hydraulic actuator with the slave hydraulic actuator including a worm gear mesh formed between first and second worm gears, and the pacing hydraulic actuator including a gear mesh formed between first and second gears with a same efficiency in both operating directions.

In another aspect, for each control segment the slave hydraulic actuator is positioned away from a center of the vehicle and the pacing hydraulic actuator is positioned towards the center of the vehicle.

In another aspect, a hydraulic fluid line extends within a first one of the control segments and a second one of the control segments with the hydraulic fluid line carrying hydraulic fluid to control movement of the hydraulic actuators of each of the first and second control segments.

In another aspect, the synchronization members of both of the first and second control segments are positioned within the hydraulic fluid line.

In another aspect, the synchronization members are spaced apart within the hydraulic fluid line by a gap with the gap positioned between the first and second control segments.

In another aspect, at least one of the control segments includes a second flight control member.

In another aspect, a shut-off valve prevents hydraulic fluid from moving to the control segments.

One aspect is directed to a method of moving first and second flight control members on a vehicle. The method includes supplying hydraulic fluid to first hydraulic actuators and moving a first flight control member and supplying hydraulic fluid to second hydraulic actuators and moving a second flight control member. The method includes after the first flight control member is at a first predetermined position, preventing movement of a first synchronization member that extends between the first hydraulic actuators and maintaining a position of the first flight control member. The method includes after the second flight control member is at a second predetermined position, preventing movement of a second synchronization member that extends between the second hydraulic actuators and maintaining a position of the second flight control member. The method includes while the first flight control member remains at the first predetermined position, moving the second synchronization member and adjusting the second hydraulic actuators and moving the second flight control member from the second predetermined position.

In another aspect, the method includes activating a motor and moving the second synchronization member and adjusting the second hydraulic actuators and moving the second flight control member.

In another aspect, preventing movement of the first synchronization member includes either braking the first synchronization member with a motor or with a first one of the first hydraulic actuators.

The features, functions and advantages that have been discussed can be achieved independently in various aspects or may be combined in yet other aspects further details of which can be seen with reference to the following description and the drawings.

DETAILED DESCRIPTION

The present disclosure is directed to an actuation system for controlling flight control members of a vehicle. Each flight control member is controlled by two or more linear hydraulic actuators. A synchronization member extends between the hydraulic actuators on the same flight control member to synchronize the movements of the hydraulic actuators for consistent movement across the length of the flight control member. Brakes can engage the synchronization members and thus maintain the position of the flight control members. When hydraulic pressure is unavailable, motors can provide for moving the synchronization members to control the positioning of the hydraulic actuators and flight control members.

Figure 1:
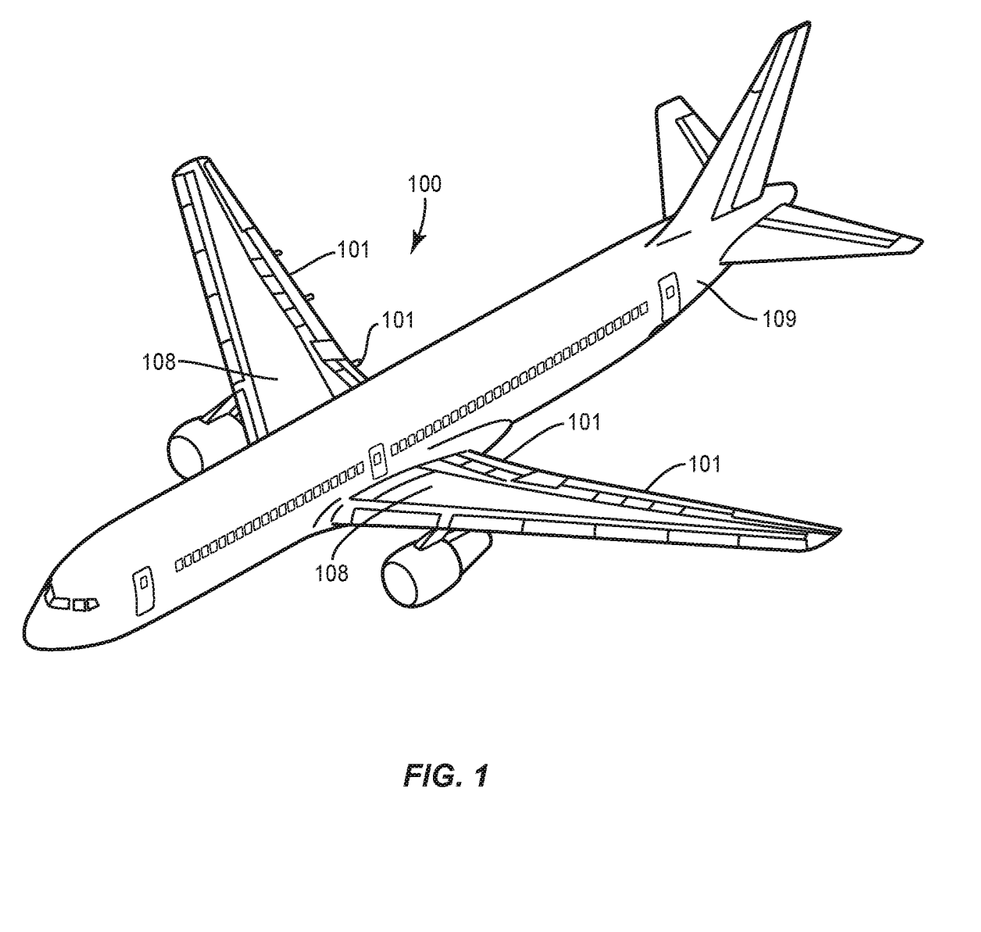
FIG. 1 is a perspective view of a vehicle that includes flight control members.

As illustrated in FIG. 1, a vehicle 100 such as an aircraft can include one or more flight control members 101. The flight control members 101 can be located at various positions on the vehicle, such as along each of the wings 108 of an aircraft as illustrated in FIG. 1. Inboard flight control members 101 are located closer to the fuselage 109 and center of the vehicle 100, a and outboard flight control members 101 are located farther away from the fuselage 109 and center of the vehicle 100. The flight control members 101 are movably attached to the wings 108 to change their orientation to control the flight.

Figure 2:
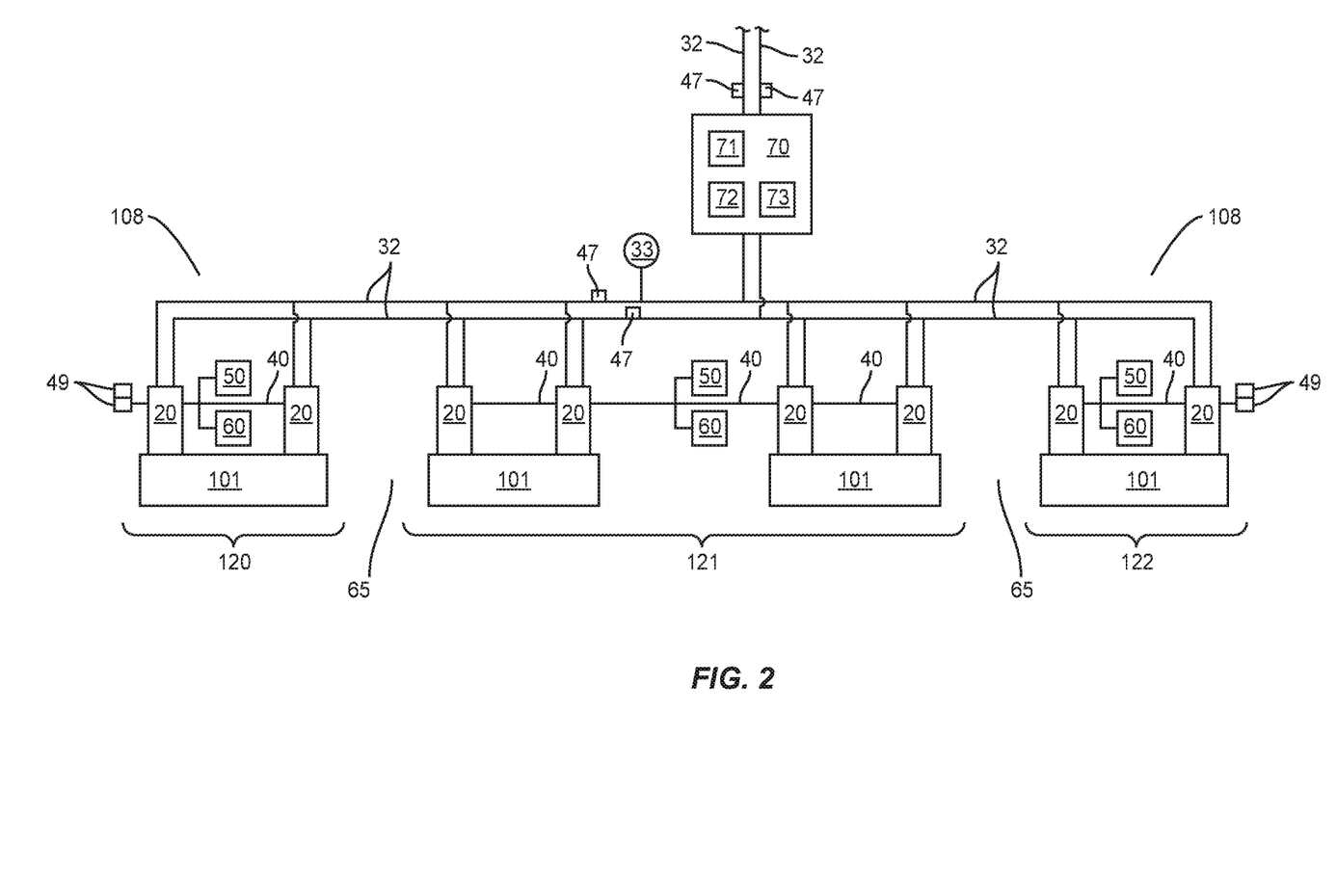
FIG. 2 is a schematic view of a hydraulic system that moves hydraulic fluid to and from hydraulic actuators in a vehicle.

As illustrated in FIG. 2, linear hydraulic actuators 20 are connected to the flight control members 101 to control the orientation relative to the wings 108. Hydraulic lines 32 supply and return hydraulic fluid from a hydraulic system in the vehicle 100 to the hydraulic actuators 20. The hydraulic fluid can be delivered to the hydraulic actuators 20 to either deploy or retract the flight control members 101.

One or more valves 70 can be positioned along the hydraulic fluid lines 32 to control the movement of the hydraulic fluid. The valves 70 can perform a variety of different functions to control the movement of hydraulic fluid along the hydraulic fluid lines 32. The valves 70 can include a shut-off valve 71 that prevents the flow of hydraulic fluid along the hydraulic fluid lines 32. The valves 70 can also include a rate valve 72 that controls the rate at which the hydraulic fluid moves through the hydraulic fluid lines 32. The valves 70 can also include a directional valve 73 that controls the direction in which the hydraulic fluid is moved in the vehicle 100, including directing the hydraulic fluid to and from the wings 108.

A synchronization member 40 extends between and connects the hydraulic actuators 20 on each of the flight control members 101. The synchronization member 40 provides for synchronizing the movement of the hydraulic actuators 20 that control each of the flight control members 101. In the design of FIG. 2, for each wing 108, a first synchronization member 40 connects the hydraulic actuators 20 on the inboard flight control member 101 and a second synchronization member 40 connects the hydraulic actuators 20 on the outboard flight control member 101. During movement of the hydraulic actuators 20 on the same flight control member 101 when one hydraulic actuator 20 attempts to move in advance of the other hydraulic actuator 20, the synchronization member 40 becomes wound up and exerts a restoring torque on the leading hydraulic actuator 20. This restoring torque brakes its motion and enables the lagging hydraulic actuator 20 to catch up. Once the hydraulic actuators 20 become synchronized, the synchronization member 40 is returned to a low torque state and the leading hydraulic actuator 20 can continue to move again.

The synchronization members 40 extend between the hydraulic actuators 20 on the same flight control member 101. A gap 65 extends between the synchronization members 40 that control the different flight control members 101. This provides for the inboard and outboard flight control members 101 to move separately from each other and be individually adjusted. Thus, the outboard flight control members 101 can be adjusted separately during a flight from the inboard flight control members 101. The synchronization members 40 can extend through a hydraulic fluid line 32 connected to the hydraulic actuators 20. Alternatively, the synchronization members 40 can be separately connected to the hydraulic actuators 20.

A single synchronization member 40 can extend between and control the hydraulic actuators 20 of the inboard flight control members 101 as illustrated in FIG. 2. Alternatively, separate synchronization members 40 can be used on the hydraulic actuators 20 of the two separate flight control members 101 with a gap 65 between the synchronization members 40.

Figure 3:
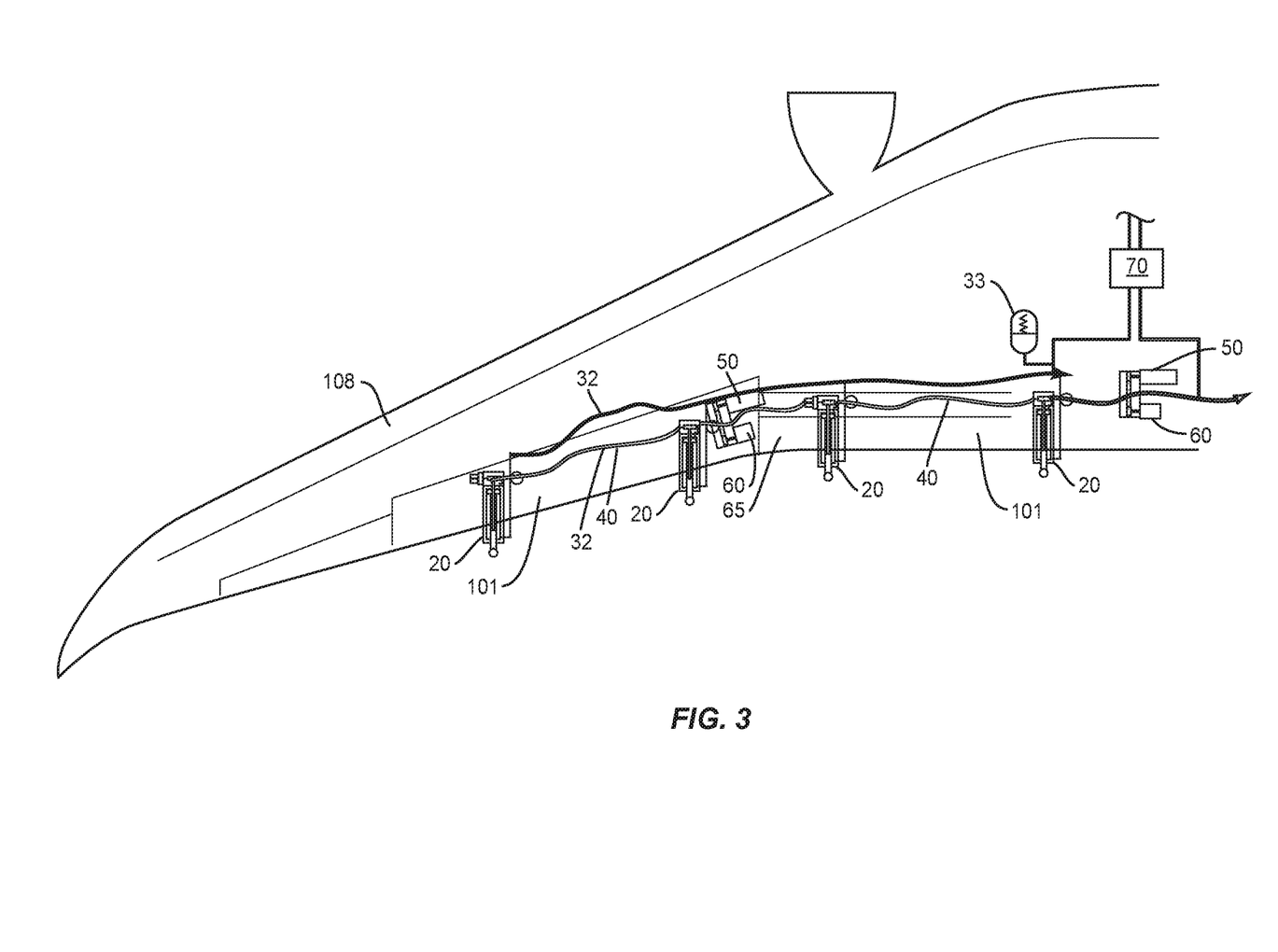
FIG. 3 is a schematic view of a hydraulic system in a wing of an aircraft that moves hydraulic fluid to and from hydraulic actuators.
Figure 4:
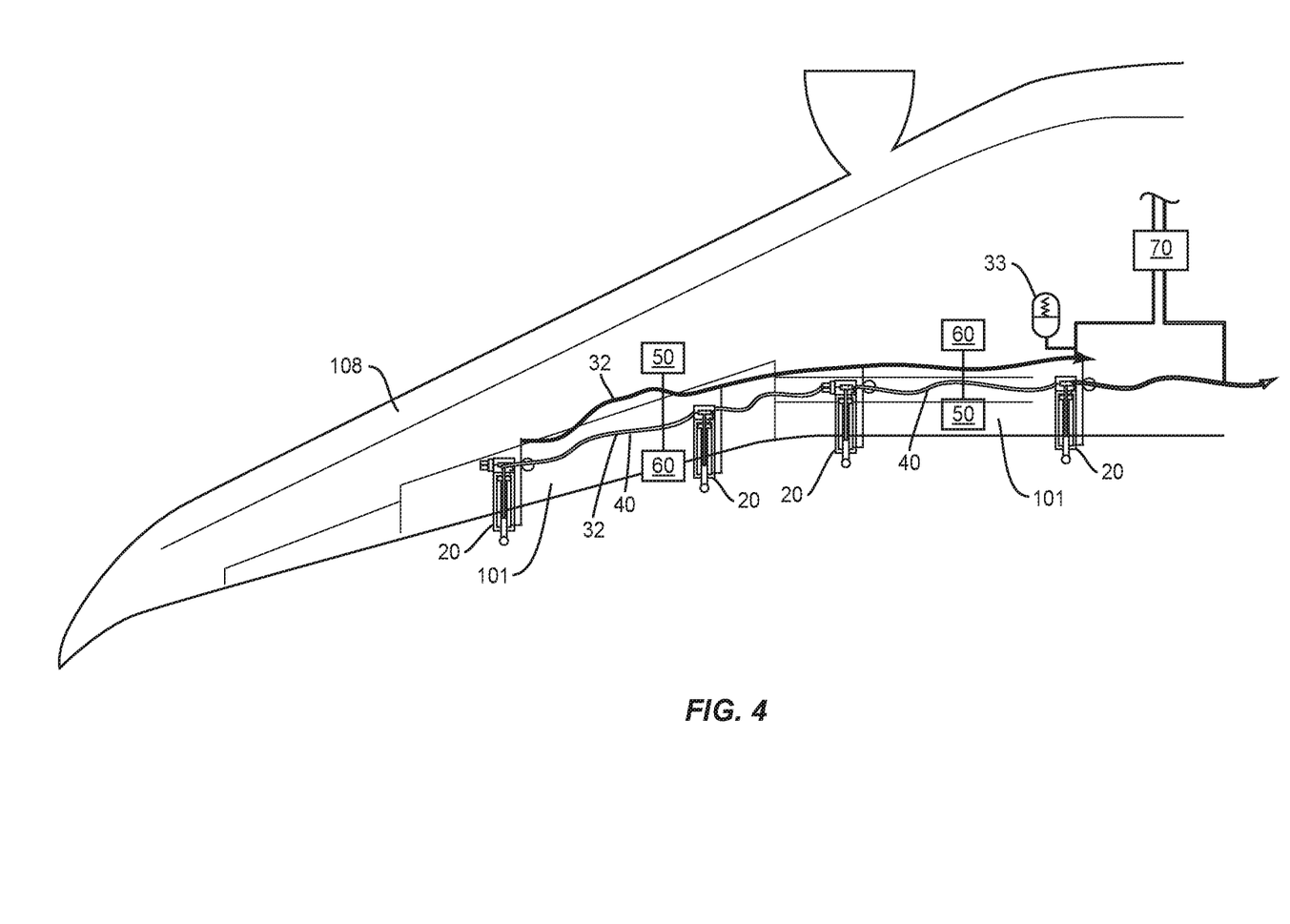
FIG. 4 is a schematic view of a hydraulic system in a wing of an aircraft that moves hydraulic fluid to and from hydraulic actuators.
Figure 5:
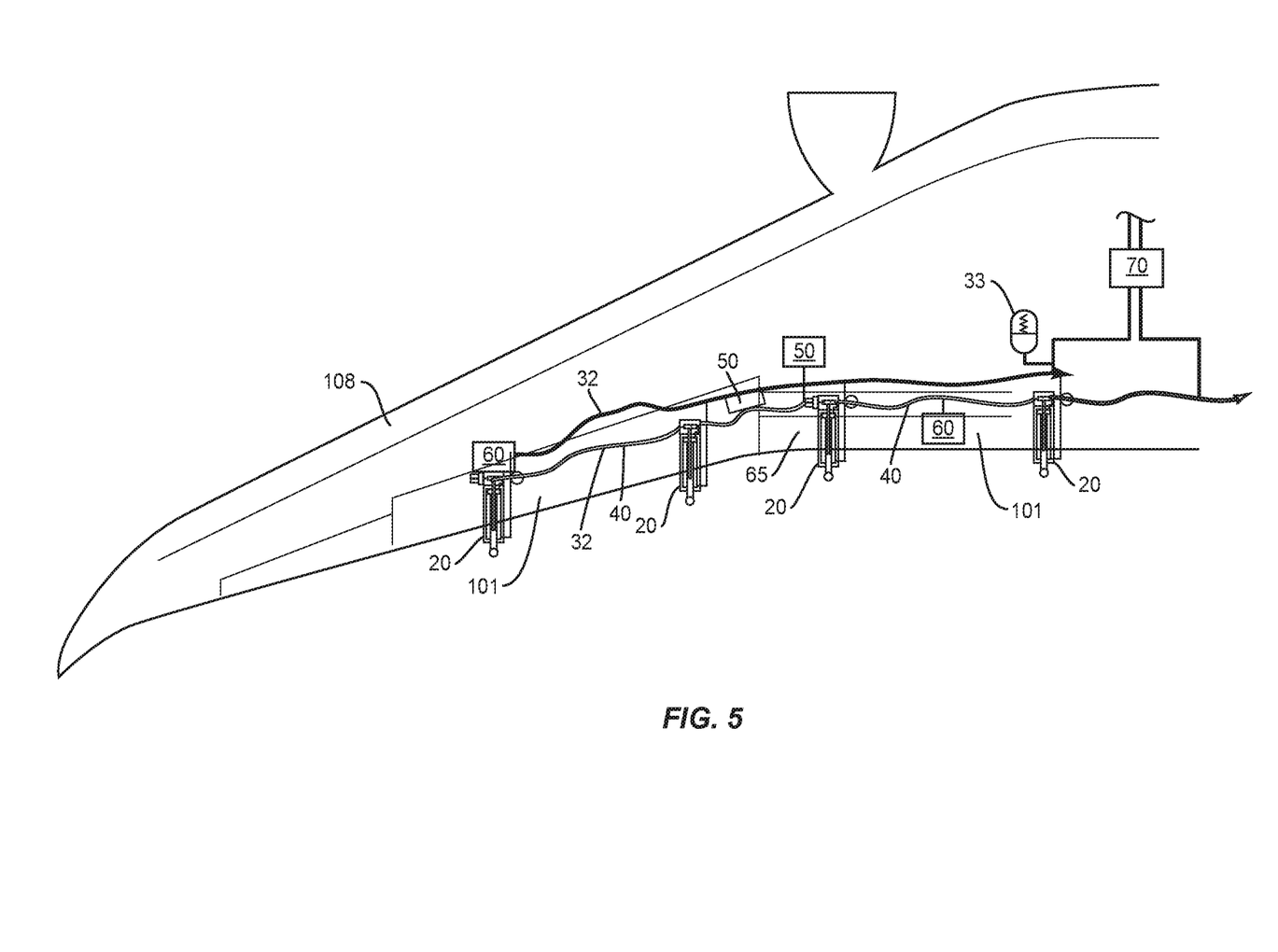
FIG. 5 is a schematic view of a hydraulic system in a wing of an aircraft that moves hydraulic fluid to and from hydraulic actuators.

The synchronization members 40 can be positioned within the interior of a hydraulic fluid line 32 as illustrated in FIG. 3. FIG. 3 includes the synchronization members 40 positioned within the hydraulic fluid line 32 that supplies hydraulic fluid to each of the hydraulic actuators 20 located along the wing 108. The gap 65 is positioned along the section of the hydraulic fluid line 32 between the inboard flight control member 101 and the outboard flight control member 101. No synchronization member 40 is positioned within this gap 65.

A brake 50 is operatively connected to each of the synchronization members 40 to prevent the movement of the synchronization members 40. For each synchronization member 40, the brake 50 prevents its movement and thus in turn prevents movement of the hydraulic actuators 20 to which they are connected. This in turn prevents the movement of the connected flight control members 101. Further, after the brake 50 stops the motion of the hydraulic actuators 20 at the commanded position, the hydraulic system can stop moving hydraulic fluid to the one or more hydraulic actuators 20.

Motors 60 are operatively connected to each of the synchronization members 40. The motors 60 provide for rotating the synchronization members 40 and thus adjusting the flight control members 101 to which they are connected. The motors 60 are operated when the hydraulic system is inoperable. Motors 60 can also be used for a slow adjustment speed of one or more flight control members 101. For example, during a high speed cruise of the vehicle 100 when a high speed adjustment of one or more of the inboard and outboard flight control members 101 is not desired, the motor 60 can provide a slow speed adjustment that provides more time to adjust the positioning. Motors 60 can be powered by a variety of sources. One design includes an electric motor 60. Another design includes a hydraulic motor 60 that is powered by a separate hydraulic supply.

The brakes 50 and motors 60 can be connected to the synchronization members 40 at different locations. This can include positioning one or both along a synchronization member 40 between the hydraulic actuators 20, on the outboard side of the hydraulic actuators 20, and on the inboard side of the hydraulic actuators 20. The brakes 50 and motors 60 can connect to the synchronization members 40 at the same or different locations. FIGS. 2, 3, 4, and 5 illustrate some of the different relative positions of the brakes 50 and motors 60 to connect to the synchronization members 40.

The vehicle 100 can include a variety of different numbers of flight control members 101 and a variety of different numbers of hydraulic actuators 20 on each flight control member 101. FIG. 2 includes a vehicle 100 that includes four flight control members 101 that form three control segments that extend along the wings 108. As illustrated in FIG. 2, a first control segment 120 includes the outboard flight control member 101 on the left-hand wing 108. A second control segment 121 includes both inboard flight control members 101. A third control segment 122 includes the outboard flight control member 101 on the right-hand wing 108. Each control segment 120, 121, 122 includes a motor 60 and a brake 50 to control the respective flight control members 101. As illustrated in FIG. 2, each of the first and third control segments 120, 122 include a brake 50 and motor 60 dedicated to the respective outboard flight control members 101. The second control segment 121 includes a brake 50 and motor 60 that are shared to control the inboard flight control members 101.

Figure 6:
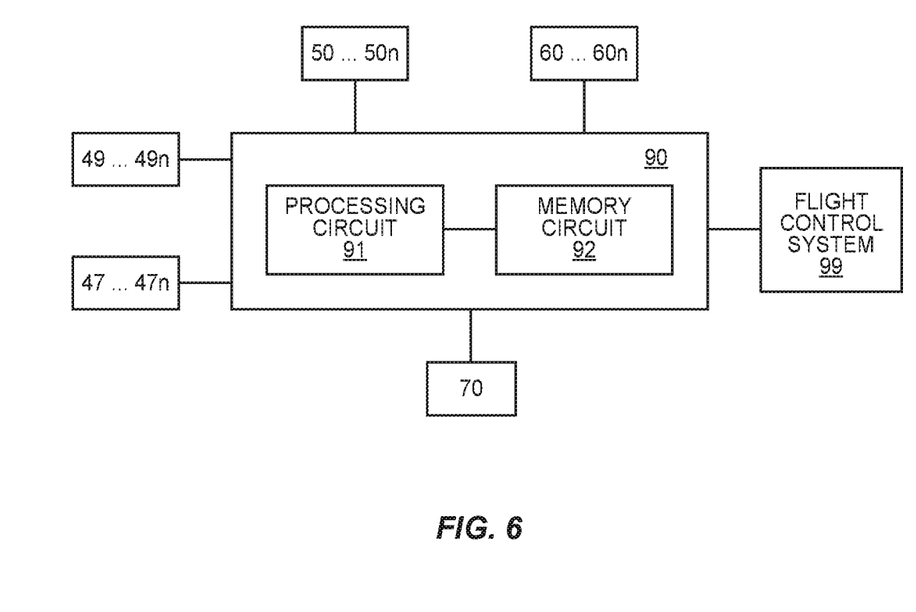
FIG. 6 is a schematic view of an actuation control unit.

An actuation control unit 90 can control the activation and movement of the hydraulic actuators 20 and the attached flight control members 101. FIG. 6 illustrates an actuation control unit 90 that includes one or more processing circuits (shown as processing circuit 91) that may include one or more microprocessors, Application Specific Integrated Circuits (ASICs), or the like, configured with appropriate software and/or firmware. A computer readable storage medium (shown as memory circuit 92) stores data and computer readable program code that configures the processing circuit 91 to implement the techniques described above. Memory circuit 92 is a non-transitory computer readable medium, and can include various memory devices such as random access memory, read-only memory, and flash memory. The actuation control unit 90 can communicate with a flight control system 99 that controls one or more functions of the vehicle 100. The flight control system 99 can provide various data to the actuation control unit 90, such as but not limited to the commanded movements of the flight control members 101.

The actuation control unit 90 controls the movement of the hydraulic fluid through the hydraulic lines 32 to position the flight control members 101 in their commanded positions. The actuation control unit 90 can control the valves 71, 72, 73 to move the hydraulic fluid as necessary along the hydraulic fluid lines 32 to control the hydraulic actuators 20. The actuation control unit 90 can receive signals from the one or more sensors 49 (see FIG. 2) indicating the position of rotation of hydraulic actuators 20 as will be explained in detail below. The actuation control unit 90 can also control the motors 60 and brakes 50.

Different types of hydraulic actuators 20 can be attached to the different flight control members 101. The different hydraulic actuators 20 assist in positioning and/or controlling the flight control members 101 during the various operational conditions of the vehicle 100.

Figure 7:
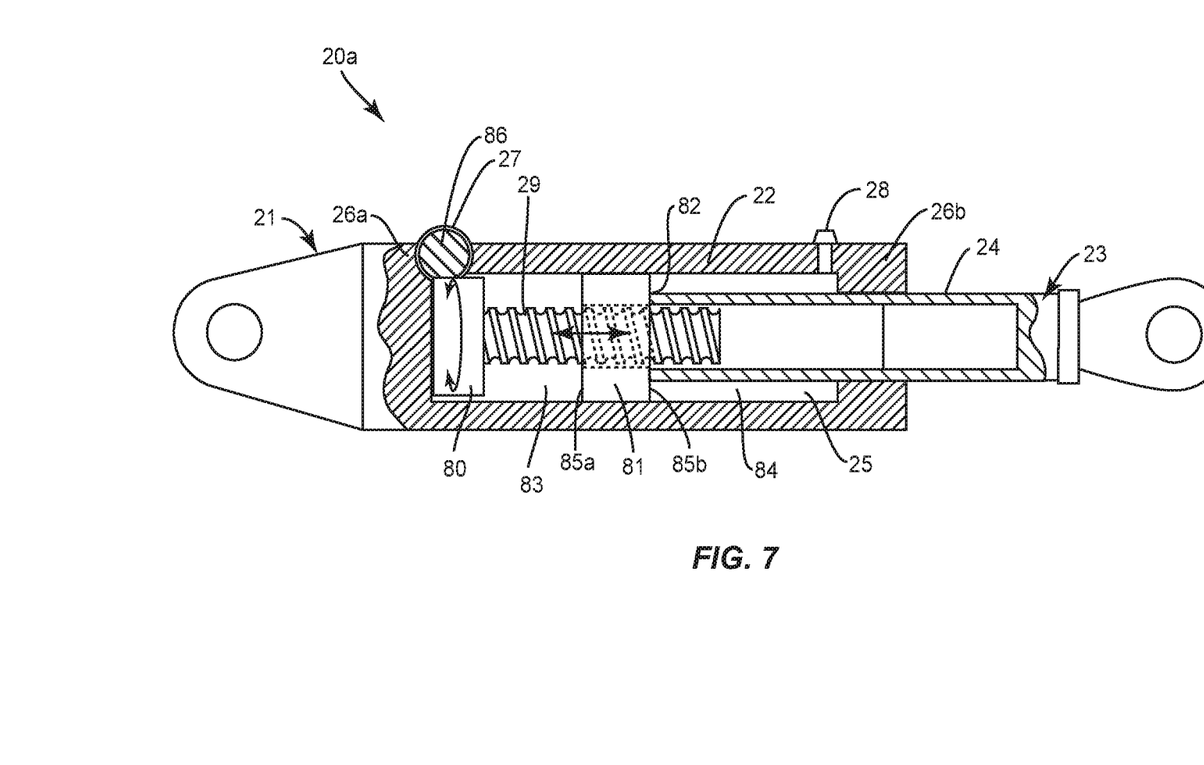
FIG. 7 is a schematic sectional side view of a slave hydraulic actuator.

FIG. 7 illustrates a slave hydraulic actuator 20a that includes a first terminal 21 that includes a housing 22 and a second terminal 23 that includes a rod 24. The first and second terminals 21, 23 are configured to be attached to different objects. One of the first and second terminals 21, 23 can be connected to a support within the wing 108, and the other terminal 21, 23 can be attached to one of the flight control members 101. Each of the first and second terminals 21, 23 can include an opening that receives a fastener to provide for the connection.

The housing 22 extends around and encloses a chamber 25 that extends between first and second end walls 26a, 26b. A first port 27 is in communication with the chamber 25 towards the first end wall 26a and a second port 28 is in communication with the chamber 25 towards the second end wall 26b. The first and second ports 27, 28 provide for the pressurized hydraulic fluid to enter and exit the chamber 25. A threaded screw 29, such as an Acme screw, extends outward from the first end wall 26a and into the chamber 25. The threaded screw 29 is attached to a worm gear 80 and rotatable relative to the chamber 25. An elongated worm gear 86 is mounted to the housing 22 and is engaged with the worm gear 80.

A piston 81 is positioned in the chamber 25 and threaded onto the threaded screw 29. The piston 81 includes an outer diameter that substantially matches the inner diameter of the chamber 25. A seal (not illustrated) such as an O-ring can extend around the outer perimeter of the piston 81 to seal against the wall of the chamber 25 to prevent the passage of hydraulic fluid. The rod 24 includes an inner end 82 that is hollow and extends around the threaded screw 29. The inner end 82 is further mounted to the piston 81.

The piston 81 is axially slidable within the chamber 25 and divides the chamber 25 into a first chamber section 83 positioned between the piston 81 and the first end wall 26a, and a second chamber section 84 positioned between the piston 81 and the second end wall 26b. The first port 27 leads into the first chamber section 83 and the second port 28 leads into the second chamber section 84. The piston 81 includes a first face 85a and an opposing second face 85b. The piston 81 can provide for an unbalanced setting with one of the piston faces 85a, 85b having a greater cross-sectional area than the opposite piston side 85a, 85b. The piston 85 can also be configured for each face 85a, 85b to have the same cross-sectional area.

In use, hydraulic fluid is introduced from a hydraulic fluid line 32 through the first port 27 and into the first chamber section 83. The introduction of the hydraulic fluid causes the piston 81 to move within the chamber 25 towards the second end wall 26a. This causes the rod 24 to also move longitudinally relative to the housing 22 and extend the length of the hydraulic actuator 20 to a deployed position. Motion of the piston 81 causes a nut that is attached to the piston 81 to move longitudinally with respect to a threaded screw 29 which causes the threaded screw 29 to rotate as the actuator is operated.

Hydraulic fluid can also be introduced through a hydraulic fluid line 32 at the second port 28 and into the second chamber 84 to move the hydraulic actuator 20a to a retracted position. The introduced hydraulic fluid forces the piston 81 to move longitudinally within the chamber 25 towards the first end wall 26a. This in turn causes the rod 24 to retract inward into the housing 22. Movement of the piston 81 again causes rotation of the threaded screw 29 which is transferred to the synchronization member 40.

When the hydraulic fluid is introduced into one of the chambers 83, 84, the hydraulic fluid in the opposing chamber 83, 84 is forced outward and into a hydraulic fluid line 32. When one chamber 83, 84 is connected to a source of hydraulic pressure, the other chamber 83, 84 is connected to a return line, thereby ensuring that the hydraulic actuator 20 does not become hydraulically locked.

Figure 8:
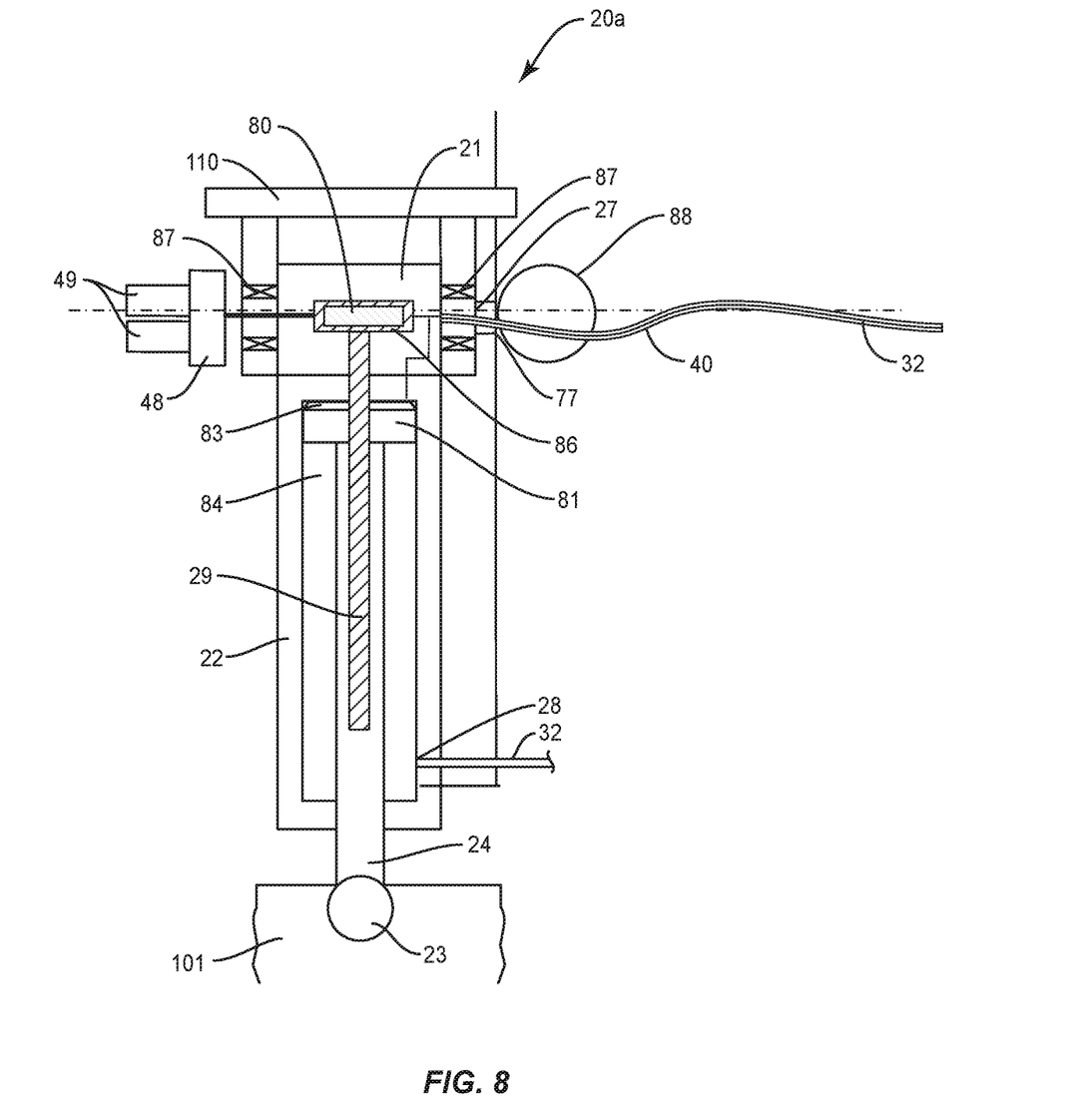
FIG. 8 is a schematic view of the slave hydraulic actuator of FIG. 7.

FIG. 8 schematically illustrates a slave hydraulic actuator 20a mounted between a support 110 on a wing 108 and a flight control member 101. The synchronization member 40 is incorporated within the hydraulic fluid line 32 connected to the first port 27. The synchronization member 40 and hydraulic fluid line 32 are connected to a swiveling hydraulic fitting 77. The synchronization member 40 is connected to the elongated worm gear 86 that is mounted with bearings 87 to the support 110. A coiled tube 88 separate from the hydraulic fluid line 32 accommodates the rotation of the hydraulic actuator 20a relative to the wing 108. One or more sensors 49 can be configured to sense the rotation of the elongated worm gear 86 and/or synchronization member 40.

Figure 9:
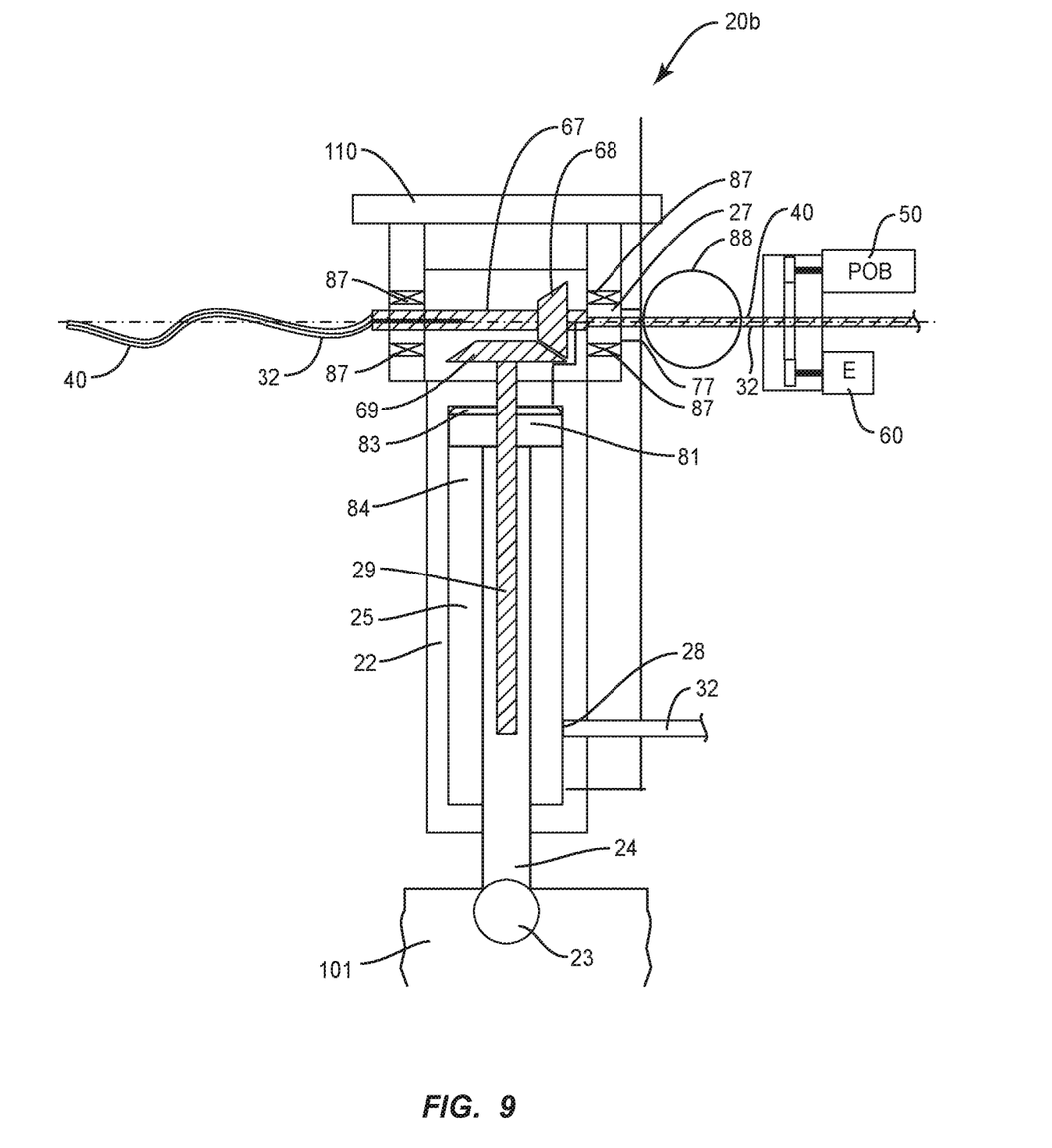
FIG. 9 is a schematic view of a pacing hydraulic actuator.

One or more hydraulic actuators 20 can include a pacing hydraulic actuator 20b as schematically illustrated in FIG. 9. The hydraulic actuator 20b includes a gear mesh that has high efficiency in both operating directions. One type of gear mesh is a bevel gear mesh. Another type of gear mesh is a spur gear mesh. FIG. 9 includes a pacing hydraulic actuator 20b that includes a bevel gear 69 mounted to the threaded screw 29 (in place of the worm gear 80 of the slave hydraulic actuator 20a). The hydraulic actuator 20b also includes a bevel gear 68 and shaft 67 mounted to the support 110 (in place of the elongated worm gear 86 of the slave hydraulic actuator 20a). The bevel gear 69 is engaged with the bevel gear 68. The hydraulic fluid line 32 is connected to the first port 27 to supply hydraulic fluid to the first chamber section 83. The hydraulic fluid line 32 further extends downstream from the hydraulic actuator 20b to supply hydraulic fluid to one or more downstream hydraulic actuators 20. Further, the synchronization member 40 is connected to the shaft 67 and extends downstream and is connected to the downstream slave hydraulic actuator 20a. The gear mesh between the gears 68, 69 of the pacing hydraulic actuator 20b, such as a bevel gear mesh, can be about the same for forward and reverse efficiency.

The pacing hydraulic actuator 20b operates in a similar manner as the slave hydraulic actuator 20a. Hydraulic fluid is moved into one of the chambers 83, 84 to move the piston 81 within the chamber 25. Movement of the piston 81 in turn causes rotation of the threaded screw 29 and rotation of the gears 68, 69. The synchronization member 40 and hydraulic fluid line 32 are connected to a swiveling hydraulic fitting 77. A coiled tube 88 separate from the hydraulic fluid line 32 accommodates the rotation of the hydraulic actuator 20b relative to the wing 108.

The use of both a slave hydraulic actuator 20a and a pacing hydraulic actuator 20b on a flight control member 101 prevents inadvertent movement of the flight control members 101. The pacing hydraulic actuators 20b include the meshing gears 68, 69. Stresses on the flight control members 101 can cause the piston 81 to apply a force on the gears 68, 69. The piston 81 can back drive the meshed gears 68, 69 which can drive the synchronization member 40. However, the slave hydraulic actuators 20a cannot be back driven by the piston 81 because of the worm gear mesh between the worm gears 80, 86.

FIG. 9 also illustrates the brake 50 and motor 60 connected to the synchronization member 40. As explained above, the brake 50 and motor 60 can be connected to the synchronization member 40 at various locations.

Figure 10:
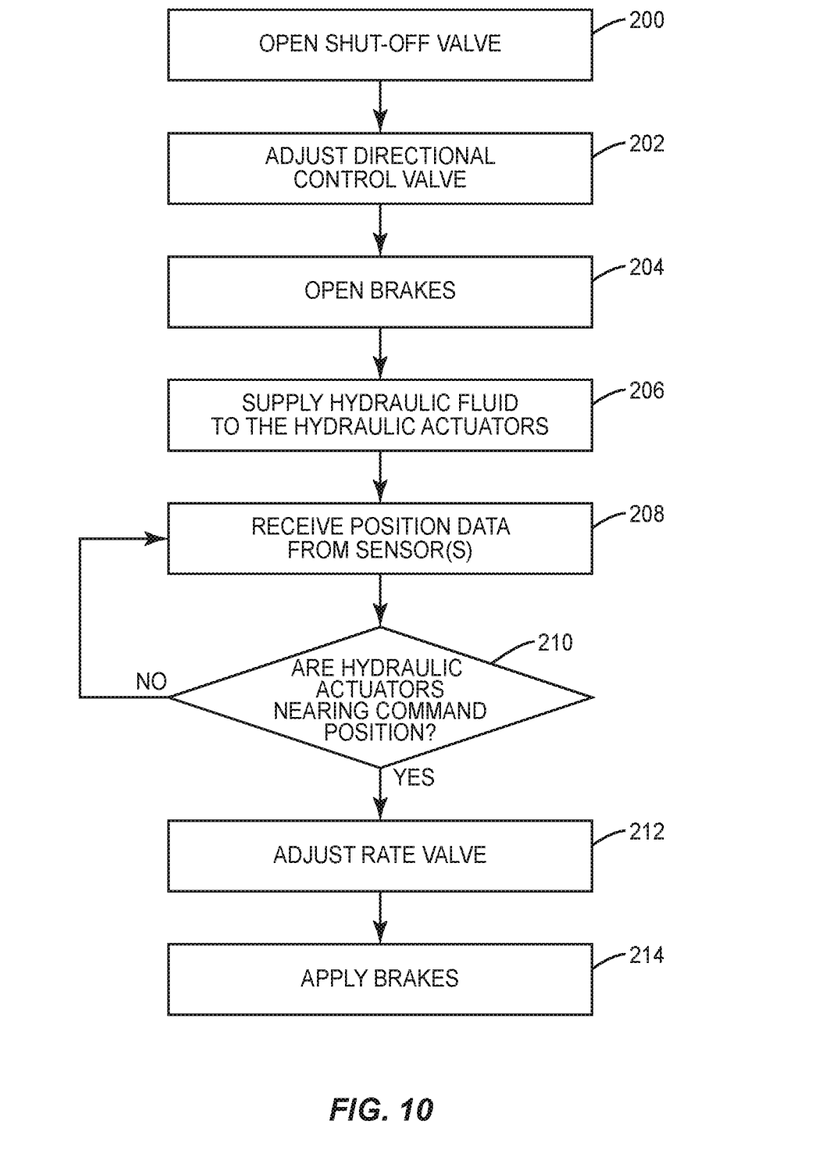
FIG. 10 is a flowchart diagram of a method of moving one or more flight control members on a vehicle.

FIG. 10 illustrates a method of operating the hydraulic actuators 20 to control a flight control member 101. The actuation control unit 90 opens the shut-off valve 71 (block 200) for hydraulic fluid to move along the hydraulic fluid lines 32. The direction control valve 73 is adjusted (block 202) to cause the hydraulic actuators 20 to either to extend or retract. The brakes 50 are opened for each control segment 120, 121, 122 that is to be adjusted (block 204) to allow for movement of the hydraulic actuators 20.

Hydraulic fluid is moved through the hydraulic fluid lines 32 to the hydraulic actuators 20 (block 206). This causes the hydraulic actuators 20 to either deploy or retract and thus move the one or more flight control members 101 in the applicable control segments 120, 121, 122. The movement of the pacing hydraulic actuator 20b applies a rotational force to the synchronization member 40 because the piston 81 moves within the chamber 25 which back drives the threaded screw 29 which rotates the bevel gears 68,69 which rotates the synchronization member 40. The slave hydraulic actuator 20a does not drive the synchronization member 40 because the meshing worm gears 80, 86 cannot be back driven by movement of the piston 81 along the threaded screw 29.

During the movement, if the slave hydraulic actuator 20a has a lower resisting airload and attempts to move faster, the meshing worm gears 80, 86 of the slave hydraulic actuator 20a is not back driven and provides resistance and controls the speed of the deployment or retraction of the hydraulic actuator 20a. In the event that the pacing hydraulic actuator 20b has a lower resisting airload, the meshing gears 68, 69 rotate the synchronization member 40. The synchronization member 40 becomes wound up and exerts a restoring torque on the pacing hydraulic actuator 20b that brakes its motion and enables the slave hydraulic actuator 20a to catch up. Once the slave and pacing hydraulic actuators 20a, 20b become synchronized, the synchronization member 40 is returned to a low torque state and the leading hydraulic actuator 20 can continue to move again.

The rotation of the synchronization member 40 is sensed by one or more sensors 49. The sensors 49 can be positioned at various locations along the synchronization member 40, including the end as illustrated in FIG. 2. The one or more sensors 49 provide feedback to the actuation control unit 90 indicative of whether the hydraulic actuators 20a, 20b and the flight control member 101 is nearing the commanded position (block 208). The actuation control unit 90 determines whether the hydraulic actuators 20 are nearing the commanded position (block 210). If yes, the rate valve 72 can be adjusted to slow the hydraulic fluid to improve the accuracy of the stopping position of the hydraulic actuators 20 (block 212). If the hydraulic actuators 20 are not nearing the commanded position, the hydraulic fluid supply remains and the position monitoring continues.

Once the hydraulic actuators 20a, 20b move the flight control members 101 to the commanded position, the brakes 50 are applied (block 214). This prevents further movement of the hydraulic actuators 20a, 20b and maintains the position of the flight control member 101.

The configuration of the hydraulic actuators 20 and the hydraulic system 30 provide for trailing edge variable camber for each of the wings 108 for differential operation of the flight control members 101 on each wing 108 during flight. The inboard and outboard flight control members 101 can be positioned to different amounts of deflection to optimize wing loading based on vehicle variables including the mach number, the altitude, and the weight.

Figure 11:
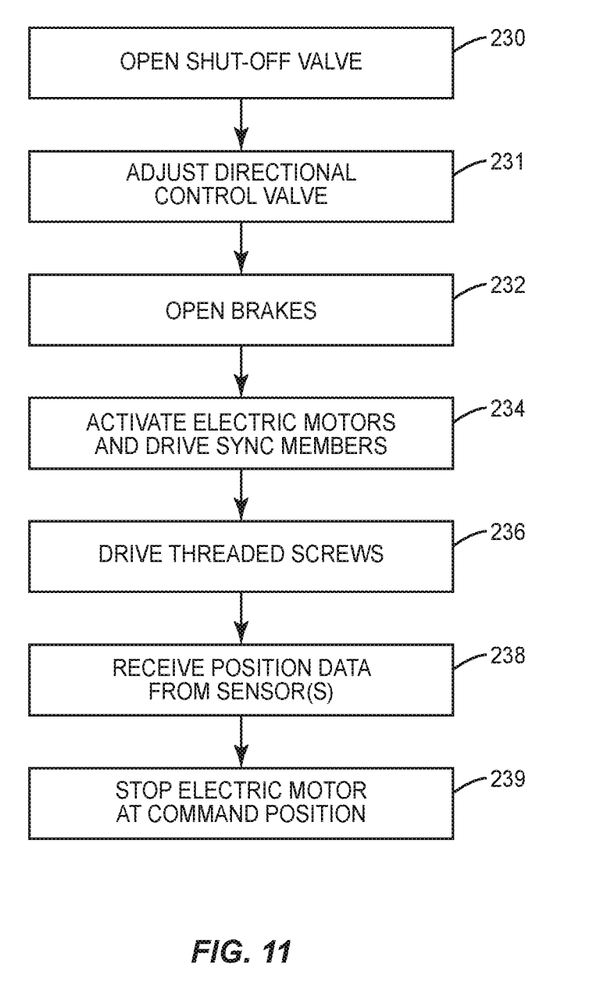
FIG. 11 is a flowchart diagram of a method of moving one or more flight control members on a vehicle.

FIG. 11 illustrates adjustment of the one or more segments 120, 121, 122 in the event of loss of the hydraulic system that moves the hydraulic fluid. The loss can be detected by the actuation control unit 90 based on readings from one or more pressure sensors 47 along the fluid line 32. The actuation control unit 90 can also receive an indication from the flight control system 99.

The shut-off valve 71 is opened to allow the flow of hydraulic fluid along the hydraulic fluid lines 32 (block 230). The directional control valve 73 is also adjusted to allow for either deployment or retraction of the hydraulic actuators 20 (block 231). The brakes 50 are released for each of the control segments 120, 121, 122 that are to be adjusted (block 232). The motor 60 in each control segment is activated to drive the synchronization member 40 to adjust the lengths of the hydraulic actuators 20 (block 234). The rotation of the synchronization member 40 rotates the threaded screw 29 in each hydraulic actuator 20 (block 236). The rotation drives the piston 81 to adjust the length of the hydraulic actuators 20a, 20b. Position data can be received from the one or more sensors 49 indicating the rotational position of the synchronization member 40 (block 238). The actuation control unit 90 can use the data to determine when the flight control members 101 are at the commanded position and then stop the motors 60 (block 239).

The rotation of the threaded screw 29 in turn causes the piston 81 to move within the chamber 25. During deployment, the movement of the piston 81 can cause hydraulic fluid to move from the hydraulic fluid lines 32 into the first chamber section 83 and out of the second chamber section 84. During retraction, the movement of the piston 81 can cause hydraulic fluid to move out of the first chamber section 83 and into the second chamber section 84. Differences in the volume of the hydraulic fluid that moves into and out of the first and second chambers 83, 84 can be accommodated in one or more reservoirs 33 that are located along the hydraulic fluid lines 32. Depositing the excess hydraulic fluid in the one or more reservoirs 33 can prevent loss of the hydraulic fluid in the event there is a leak in the hydraulic system that lead to the loss of hydraulic power.

During the operation using the motor 60, in the event of the synchronization member 40 failing at a point between the slave hydraulic actuator 20a and the pacing hydraulic actuator 20b, the worm gear mesh formed between the worm gears 80, 86 will maintain the position of the slave hydraulic actuator 20a. In the event that the synchronization member 40 fails at a point between the brake 50 and the pacing hydraulic actuator 20b, the worm gear mesh formed between the worm gears 80, 86 in the slave hydraulic actuator 20a will maintain the position of the synchronization member 40 and thus the pistons 81 in both the slave and pacing hydraulic actuators 20a, 20b.

The actuation system 10 and methods controlling a position of the flight control members 101 can be used with a variety of vehicles 100. One vehicle 100 includes a commercial aircraft that includes rows of seats each configured to accommodate a passenger. Other vehicles 100 include but are not limited to manned aircraft, unmanned aircraft, manned spacecraft, unmanned spacecraft, manned rotorcraft, unmanned rotorcraft, satellites, rockets, missiles, manned terrestrial aircraft, unmanned terrestrial aircraft, manned surface water borne aircraft, unmanned surface water borne aircraft, manned sub-surface water borne aircraft, unmanned sub-surface water borne aircraft, and combinations thereof. The flight control members 101 can be located at various positions on the vehicles 100 to control the flight.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. An actuation system to control first and second flight control members on a vehicle, the actuation system comprising:
a first pair of hydraulic actuators that are operatively connected to a first flight control member;
a second pair of hydraulic actuators that are operatively connected to a second flight control member;
a first synchronization member that extends between the first pair of hydraulic actuators to synchronize movements of the first pair of hydraulic actuators;
a second synchronization member that extends between the second pair of hydraulic actuators to synchronize movements of the second pair of hydraulic actuators, the second synchronization member being independent from the first synchronization member;
a first brake to prevent movement of the first synchronization member;
a second brake to prevent movement of the second synchronization member;
a first motor operatively connected to the first synchronization member to adjust the first pair of hydraulic actuators to adjust the first flight control member independently from the second flight control member; and
a second motor operatively connected to the second synchronization member to adjust the second pair of hydraulic actuators to adjust the second flight control member independently from the first flight control member;
each of the first and second pairs of hydraulic actuators comprising a pacing hydraulic actuator with a first gear configuration that can be back-driven by the respective first and second flight control members and drive the respective synchronization member, and each of the first and second pair of hydraulic actuators comprising a slave hydraulic actuator with a different second gear configuration that cannot be back-driven by the respective first and second flight control members.

2. The actuation system of claim 1, wherein the slave hydraulic actuator comprises meshing first and second worm gears and the pacing hydraulic actuator comprising meshing first and second gears with a same efficiency in both operating directions.

3. The actuation system of claim 2, wherein each of the first pair of hydraulic actuators and the second pair of hydraulic actuators comprises a first chamber section that receives hydraulic fluid to extend the first pair of hydraulic actuators and the second pair of hydraulic actuators and a second chamber section that receives the hydraulic fluid to retract the first pair of hydraulic actuators and the second pair of hydraulic actuators.

4. The actuation system of claim 1, wherein the first and second synchronization members are spaced apart by a gap, the gap positioned between the first pair of hydraulic actuators and the second pair of hydraulic actuators.

5. The actuation system of claim 1, further comprising a hydraulic fluid line that extends between each hydraulic actuator of the first pair of hydraulic actuators and the second pair of hydraulic actuators and wherein the first and second synchronization members are positioned within the hydraulic fluid line.

6. The actuation system of claim 1, further comprising an actuation control unit configured to:
receive signals from sensors indicating an angular orientation of the first synchronization member and the second synchronization member; and
in response to the signals, adjust valves to control a flow of hydraulic fluid to the first pair of hydraulic actuators and the second pair of hydraulic actuators.

7. The actuation system of claim 1, wherein at least one of the first brake and the first motor are operatively connected to the first synchronization member between the first pair of hydraulic actuators.

8. The actuation system of claim 1, wherein the second brake is operatively connected to the second synchronization member at a first point and the second motor is operatively connected to the second synchronization member at a different second point.

9. The actuation system of claim 1, wherein the first gear configuration of the pacing hydraulic actuator comprises a pair of bevel gears.

10. The actuation system of claim 1, wherein the first gear configuration of the pacing hydraulic actuator comprises a pair of gears that form a spur gear mesh.

11. An actuation system to control first and second flight control members on a vehicle, the actuation system comprising:
two or more control segments that extend along the vehicle, each of the control segments comprising:
a flight control member;
hydraulic actuators that are operatively connected to the flight control member;
a synchronization member that extends between and is connected to the hydraulic actuators to synchronize movements of the hydraulic actuators;
a brake operatively connected to the synchronization member to prevent rotation of the synchronization member; and
a motor operatively connected to the synchronization member to rotate the synchronization member to adjust the hydraulic actuators and position the flight control member relative to the vehicle;
an actuation control unit comprising a processing circuit to position of the flight control members relative to the vehicle;
the synchronization members being spaced apart along the vehicle and being independent from each other;
wherein the hydraulic actuators of the control segments comprise a slave hydraulic actuator and a pacing hydraulic actuator, the slave hydraulic actuator comprises a first gear combination comprising a worm gear mesh formed between first and second worm gears and the pacing hydraulic actuator comprising a different second gear mesh formed between first and second gears with a same efficiency in both operating directions.

12. The actuation system of claim 11, wherein for each control segment the slave hydraulic actuator is positioned away from a center of the vehicle and the pacing hydraulic actuator is positioned towards the center of the vehicle.

13. The actuation system of claim 11, further comprising a hydraulic fluid line that extends within a first one of the control segments and a second one of the control segments, the hydraulic fluid line carrying hydraulic fluid to control movement of the hydraulic actuators of each of the first and second flight control segments.

14. The actuation system of claim 13, wherein the synchronization members of both of the first and second control segments are positioned within the hydraulic fluid line.

15. The actuation system of claim 14, wherein the synchronization members are spaced apart within the hydraulic fluid line by a gap, the gap positioned between the first and second control segments.

16. The actuation system of claim 11, wherein at least one of the control segments comprises a second flight control member.

17. The actuation system of claim 11, further comprising a shut-off valve to prevent hydraulic fluid from moving to the control segments.

18. A method of moving first and second flight control members on a vehicle, the method comprising:
supplying hydraulic fluid to first hydraulic actuators and moving a first flight control member and supplying hydraulic fluid to second hydraulic actuators and moving a second flight control member;
after the first flight control member is at a first predetermined position, preventing movement of a first synchronization member that extends between the first hydraulic actuators and maintaining the first flight control member at the first predetermined position;
after the second flight control member is at a second predetermined position, preventing movement of a second synchronization member that extends between the second hydraulic actuators and maintaining the second flight control member at the second predetermined position;
while the first flight control member remains at the first predetermined position, moving the second synchronization member and adjusting the second hydraulic actuators and moving the second flight control member from the second predetermined position.

19. The method of claim 18, further comprising activating a motor and moving the second synchronization member and adjusting the second hydraulic actuators and moving the second flight control member.

20. The method of claim 18, wherein preventing movement of the first synchronization member comprises either braking the first synchronization member with a motor or with a first one of the first hydraulic actuators.

* * * * *